United States Patent [19]

Kaplan

[11] Patent Number: 5,412,371

[45] Date of Patent: May 2, 1995

[54] DETECTOR ARMING VEHICLE SECURITY SYSTEM

[76] Inventor: Neil B. Kaplan, 2239 Quail Ridge S., Palm Beach Gardens, Fla. 33418

[21] Appl. No.: 175,178

[22] Filed: Dec. 29, 1993

Related U.S. Application Data

[63] Continuation of Ser. No. 943,058, Sep. 10, 1992, abandoned.

[51] Int. Cl.6 ............................................. B60R 25/10
[52] U.S. Cl. .................................. 340/426; 180/287; 307/10.2; 340/430
[58] Field of Search ............... 340/426, 428, 430, 565, 340/541, 542, 539; 307/10.2; 180/287

[56] References Cited

U.S. PATENT DOCUMENTS

| | | | |
|---|---|---|---|
| 261,227 | 10/1890 | Shimomura | 340/426 |
| 3,930,226 | 12/1975 | Plumberg | 340/430 |
| 4,638,294 | 1/1987 | Sakurai | 340/426 |
| 4,819,050 | 4/1989 | Manzoni | 340/430 |
| 4,876,649 | 10/1989 | Kawai et al. | 307/10.2 |
| 4,926,160 | 5/1990 | Hwang | 307/10.2 |
| 4,929,925 | 5/1990 | Bodine et al. | 340/426 |
| 5,049,867 | 9/1991 | Stouffer | 340/426 |
| 5,079,538 | 1/1992 | DeFino et al. | 340/426 |
| 5,128,650 | 7/1992 | Peters et al. | 340/426 |
| 5,153,558 | 10/1992 | Robinson et al. | 340/426 |
| 5,285,186 | 2/1994 | Chen | 340/426 |

*Primary Examiner*—Brent Swarthout
*Attorney, Agent, or Firm*—Cesari and McKenna

[57] ABSTRACT

An electronic security system for protecting an interior space such as the interior of an automobile includes a settable alarm for producing, when set by an arming signal, an alarm indication in response to a trigger signal, an arming circuit which, when activated, provides a setting signal to the alarm and activating means for activating and deactivating the arming circuit. The system also includes a detector for detecting a presence in the space being protected and providing a trigger signal to the alarm in response thereto and a detector, which may be the same as the detector which triggers the alarm, to inhibit activation of the arming circuit when a presence is detected in the space before the alarm is set. When the system is implemented as a vehicle anti-theft device, it may also include provision for preventing the system from becoming armed when the vehicle's engine is running and for preventing the vehicle's automatic door locks from locking when the vehicle is still occupied.

7 Claims, 1 Drawing Sheet

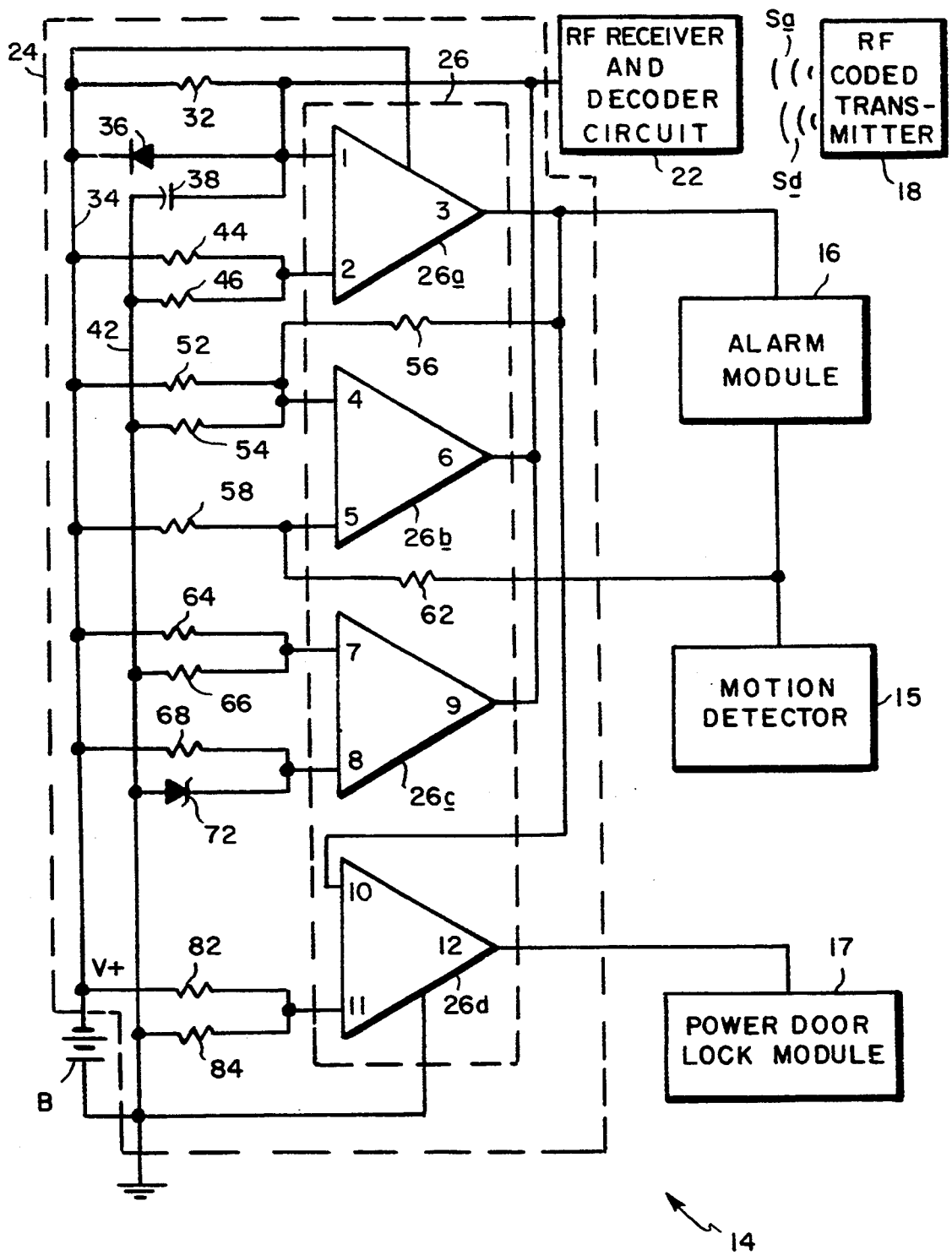

DETECTOR ARMING VEHICLE SECURITY SYSTEM

This application is a continuation of application Ser. No. 07/943,058 filed Sep. 10, 1992, now abandoned.

FIELD OF THE INVENTION

This invention relates to a vehicle security system for preventing unauthorized use of a vehicle. It relates more particularly to a passive system that becomes armed and operative automatically when a user leaves the vehicle.

BACKGROUND OF THE INVENTION

There are many types of vehicle security systems or vehicle anti-theft systems in use today for preventing unauthorized entry into, and operation of, a vehicle. A system such as this usually includes some means for disabling the vehicle when the system is armed or rendered operative and some kind of an alarm which sounds when attempts are made to enter the vehicle or to lift the vehicle's hood or to tamper with the security system. In systems designed for incorporation into vehicles with power door locks, the system may also include a module for automatically actuating the door locks when the vehicle is armed or rendered operative.

Some vehicle security systems are so-called active systems in the sense that the system is armed and disarmed by actuation of a key switch outside the vehicle. Some contemporary active systems use coded radio frequency (rf) transmitters and receivers to arm and disarm the system. An example of this type of arrangement is disclosed in U.S. Pat. No. 3,703,714.

Other systems are denominated passive systems because they become armed or set automatically after the operator leaves the vehicle. For example, some passive systems become armed a selected time after the ignition has been turned off. Usually such systems require the installation of a conductor from the security system to the ignition circuitry to sense whether or not the ignition is turned on. Other systems are set automatically after all of the vehicle doors have been closed. The trouble with these prior passive systems is that they fail to take into consideration whether or not there are any passengers in the vehicle at the time the system is armed. Obviously, if a person or pet happens to be in the car when the system becomes armed, any motion of that person or pet would set off the alarm. Also, if the system includes an automatic door lock feature, the arming of the system may often result in the locking of the doors, making it more difficult for a less competent passenger such as a small child or an aged or infirmed adult to escape from the vehicle in an emergency situation.

SUMMARY OF THE INVENTION

Accordingly, it is an object of the present invention to provide a vehicle security system which will not become armed or set unless the associated vehicle is unoccupied at the time.

Another object of the invention is to provide a system of this type which is relatively easy to install in most vehicles.

Still another object of the invention is to provide a vehicle security system which will not become armed or set when the engine of the associated vehicle is running.

A further object of the invention is provide such a system which does not require the installation of electrical conductors to the vehicle's ignition system to determine whether or not the vehicle's engine is running.

A further object of the invention is to provide a vehicle security system having one or more of the above advantages, yet which is relatively inexpensive to make and install in most vehicles.

Other objects will, in part, be obvious, and will, in part appear hereinafter. The invention accordingly comprises the features of construction, combination of elements and arrangement of parts which will be exemplified in the following detailed description, and the scope of the invention will be indicated in the claims.

My invention will be described with reference to a vehicle anti-theft system. However, it should be understood that it may be incorporated into any security system that offers space protection, including home security systems and building security systems generally.

Briefly, my system is a passive system which includes means for sensing whether or not the vehicle or other space being protected by the system is occupied. While many security systems incorporate infra-red, ultrasonic, microwave or other motion detectors to provide space protection after the systems are armed, my security system uses the output of the motion detector to control the arming of the system itself. In other words, my system uses the motion detection means to sense the presence of people or moving things in the associated vehicle or space and to prevent the arming of the system upon the detection of such motion. Preferably, the motion detector used to arm the security system is the same one used to set off the system's alarm when the associated vehicle or other space is invaded. Therefore, the incorporation of the invention into a more or less conventional passive security system does not add appreciably to the overall cost of that system because the motion detection means is already part of the system.

My security system designed for vehicle protection also includes provision for preventing the arming or setting of the system if the engine of the associated vehicle is running. Many present day anti-theft devices already include provision for controlling engine operation. Invariably, however, this provision comes into play only after the anti-theft device is armed to prevent an intruder from starting the engine and stealing the vehicle. My system takes advantage of the fact that when a vehicle's engine is running, the voltage in the line from the vehicle's battery is higher than the standing battery voltage. The system makes a simple voltage comparison to verify that the vehicle's engine has been shut off before the system can become armed. Thus, the detection of whether or not the vehicle's engine is running does not require any special conductors leading from the security system to the vehicle's ignition circuitry as is the case with some prior anti-theft devices incorporating engine kill switches.

Preferably, in my system designed for automotive use, the arming of the system is dependant upon both whether or not the associated vehicle is occupied and whether or not the vehicle's engine is running. However, it will be apparent that definite advantages result from a system which is dependant upon only one of those arming conditions.

Also, since the incorporation of the invention into an existing anti-theft or space protection system can be accomplished relatively easily and inexpensively, the invention should find wide application not only in systems designed to prevent auto-theft, but also in space security systems generally such as those used to protect home and office spaces.

BRIEF DESCRIPTION OF THE DRAWING

For a fuller understanding of the nature and objects of the invention, reference should be had the following detailed description taken in connection with the accompanying drawing which illustrates diagrammatically and in block form a security system incorporating my invention.

DETAILED DESCRIPTION OF ILLUSTRATIVE EMBODIMENT

Refer now to the drawing which shows a vehicle security system 14 incorporating my invention and design to be installed in a vehicle (not shown) and to draw its power from the vehicle's battery B. The system includes a motion detector 15 for positioning inside the vehicle passenger space and which in conventional anti-theft systems only detects an intrusion into the vehicle. Detector 15 may be an infra-red, ultra-sonic, microwave, radio-wave (flash) or other known type of detector able to sense motion within the vehicle space. The illustrated detector 15 produces a low electrical output signal when it detects motion in the vehicle.

The system also includes an alarm module 16 which, when the system is armed, sounds an alarm when an intrusion into the passenger space is detected by detector 15. Additionally, if the system is designed for installation in a vehicle with power door locks, it may also incorporate a conventional power door lock module 17 for automatically controlling those door locks.

The system may be controlled remotely by signals from a hand-held RF coded transmitter 18 usually carried by the vehicle's operator. Transmitter 18 may be arranged to emit both a disarming signal $S_d$ and a different signal $S_a$ for arming the system. These signals are detected and decoded by an RF receiver and decoder circuit 22 which is part of the system installed in the vehicle. In response to these signals, circuit 22 delivers corresponding output signals to an arming circuit 24. In the illustrated system, when the decoder circuit 22 receives a signal $S_a$ from transmitter 18, the circuit 22 output floats; when that circuit receives a signal $S_d$ from transmitter 18, the circuit 22 output becomes low, i.e., drops to essentially ground voltage.

Arming circuit 24 operates to prevent the system from arming if motion detector 15 detects in the vehicle the presence of a moving occupant such as a person or pet. This same circuit also prevents the system from arming if the vehicle's engine is running. On the other hand, once those two conditions are met, (i.e., no moving occupant; engine off), circuit 24 becomes armed and controls module 17 to lock the vehicle's doors. In addition, that circuit enables the alarm module 16 so that an alarm will sound if motion detector 15 subsequently detects that someone or something has intruded into the vehicle.

Once circuit 24 has been armed, it may be disarmed by actuating transmitter 18 so that the transmitter emits a disarming signal $S_d$ to circuit 22.

The arming circuit 24 comprises a multi-section voltage comparator 26 which may be a standard integrated circuit such as a type MC 3302P IC which is a widely used automotive voltage comparator chip. It incorporates four comparators or sections 26a, 26b, 26c and 26d each of which has two input terminals and one output terminal which are identified by the numbers shown in the drawing figure. When the upper input terminal (1,4,7,10) of a particular comparator has a higher voltage than the lower input terminal (2,5,8,11) of that comparator, then the output terminal (3,6,9,12,) of that comparator goes to ground. On the other hand for a given comparator, when the voltage at the lower input terminal is higher than that at the upper input terminal, the output terminal floats at line voltage but does not drive the associated line positive.

Terminal 1 of comparator 26a receives the output of the decoder circuit 22. That terminal is also connected via a resistor 32 to a bus 34 leading to the positive side of the vehicle's battery B. There is also a diode 36 connected between terminal 1 and bus 34 in parallel with resistor 32. That terminal 1 is also connected by way of a capacitor 38 to a bus 42 leading to the negative side of battery B which corresponds to the vehicle's electrical ground. The other input terminal 2 of comparator section 26a is connected by resistor 44 to bus 34 and also by way of a second resistor 46 to bus 42. The output from comparator 26a, appearing in terminal 3 thereof, is applied to enable or arm the alarm module 16. In the illustrated system 14, a low signal at terminal 3, i.e., 0 volts, enables or arms module 16. In other words, when the voltage at input terminal 1 exceeds that at input terminal 2, the comparator 26a enables module 16. On the other hand, when the output at terminal 3 is high, alarm module 16 is disabled.

The comparator 26b is the one that actually responds to the output from the motion detector 15 to prevent the system 14 from becoming armed if motion is detected in the vehicle before the system is armed. The upper input terminal 4 of section 26b is connected via a resistor 52 to bus 34 and by way of a second resistor 54 to bus 42. Also, that same terminal receives the output of comparator section 26a via a resistor 56. The lower input terminal 5 of comparator section 26b is connected to bus 34 by way of a resistor 58. That same terminal 5 receives the output of motion detector 15 by way of a resistor 62, the output of detector 12 also being applied to alarm module 14 to trigger the alarm after the system is armed. The output of comparator section 26b at terminal 6 thereof is connected back to the input terminal 1 of section 26a.

The third comparator section 26c is the one that prevents the system from being armed if the vehicles engine is running. It has an input terminal 7 connected by way of a resistor 64 to bus 34 and via a second resistor 66 to bus 42. The other input terminal 8 of that comparator section is connected by a resistor 68 to bus 34. There is also a Zener diode 72 connected between terminal 8 and bus 42. The output of comparator section 26c at terminal 9 thereof is connected back to terminal 1 of comparator section 26a.

The fourth and last section 26d of comparator 26 controls the door lock module 17 and prevents that module from becoming operative so long as motion is detected in the vehicle. Section 26d has its upper input terminal 10 connected to receive the output of comparator section 26a. The other input terminal 11 of that same comparator section is connected by a resistor 82 to bus 34 and by way of a second resistor 84 to bus 42. The output from comparator section 26d at terminal 12 thereof controls the power door lock module 17.

We will now describe the operation of the system. In order for the arming circuit 26 to arm the system, the voltage at the input terminal 1 of comparator section 26a must be high. That voltage goes low to disarm the system when the decoder circuit 22 receives a disarm signal $S_d$ from the transmitter 18. That voltage is also low when the output from the comparator section 26b becomes low when motion detector 15 detects motion in the vehicle before the system is armed. Still further, the voltage at the input terminal 1 of comparator section 26a becomes low when the comparator section 26c produces a low output signal indicating that the associated vehicle's engine is running.

When the voltage at the terminal 1 of comparator section 26a is high, i.e., the system is not disarmed, the voltage across capacitor 38 is maintained at the full voltage of battery B, being charged by the voltage across the resistor 32. The diode 36 is present to discharge capacitor 38 in the event that the battery B is disconnected for maintenance or replacement. When the battery is re-connected, the system will not re-arm until capacitor 38 charges past the voltage reference at input terminal 2 of capacitor section 26a. Preferably, the voltage at terminal 2 is maintained at about 9 V by the voltage divider 44, 46. Thus, the charging of the capacitor 38 creates a time delay giving the vehicle operator time to close the vehicle hood after the battery is installed and to start the vehicle engine, or at least occupy the vehicle. If no one is in the vehicle and the operator simply leaves the vehicle or quickly retrieves a package from the vehicle, capacitor 38 will recharge past the 9 V present at terminal 2 causing the output of comparator section 26a to become low and enable the alarm module 16. On the other hand, if the operator enters the vehicle and either starts the engine or just occupies the vehicle, the comparator section 26b and/or 26c will prevent the system from becoming armed as will now be described.

Terminal 4 of comparator section 26b is given a reference of about 9 V by the voltage divider consisting of resistors 52 and 54. When the output of comparator section 26a is low, i.e., the system is armed, the voltage at terminal 4 of comparator section 26b is pulled down to about 3 V through resistor 56. On the other hand, terminal 5 of comparator section 26b is held at battery voltage by resistor 58 which connects via bus 34 to the positive side of the battery B. As long as the voltage at terminal 4 is less than the voltage at terminal 5 of comparator section 26b, the voltage at the output of that section at terminal 6 remains high so that section 26b does not function to disarm the system, i.e., the output of comparator 26a remains low. When motion detector 15 does detect motion in the vehicle, its output goes low (essentially 0 V). Resultantly, terminal 5 of comparator section 26b is pulled down to about 6 V through resistor 62. However, the low output from detector 15 will not set off the alarm module 16 if that module is disabled by a high output voltage from comparator 26a that results from a low input voltage to that comparator's input terminal from the output of comparator section 26b. There are four possible combinations of voltages at the input terminals 4 and 5 of comparator section 26b, only one of which produces a disarming or disabling low output voltage at the output terminal 6 of section. These combinations are as follows:

| 4 | 5 | 6 |
|---|---|---|
| 9V | 12V | |
| 9V | 6V | low output |
| 3V | 12V | |

| 4 | 5 | 6 |
|---|---|---|
| 3V | 6V | |

As shown by the above chart, when the system is armed so that the voltage at terminal 4 of section 26b is at 3 V, the output terminal 6 of comparator section 26b cannot have an output which means that the output of the motion detector 15 cannot disarm the system. However, that output will function to trigger the alarm module 16 signaling that an intruder has entered the vehicle.

On the other hand, when the system is disarmed, i.e., the voltage at the output terminal 3 of comparator section 26a is high, terminal 4 of comparator section 26b is maintained at 9 V. When the output of motion detector 15 goes low in response to motion detection, terminal 5 of comparator section 26b goes to about 6 V. This causes the voltage at the output terminal 6 to go to ground which prevents the capacitor 38 from charging, thereby preventing the system from becoming armed. When motion detector 15 no longer senses motion in the vehicle, terminal 5 of comparator section 26b goes to 12 V and the output terminal 6 floats. This allows capacitor 38 to charge until the voltage at terminal 1 of comparator section 26a exceeds that at terminal 2 so that the voltage at the output of that section 26a goes low and enables alarm module 16.

Thus, to summarize the operation of the comparator section 26b, when the system is disarmed, section 26b will respond to the output from the motion detector 15 to prevent the arming of the system. On the other hand, when the system is armed, the detector 15 will cause the alarm module 16 to sound an alarm if it detects a person trying to enter the vehicle.

The comparator section 26c compares the voltage from the vehicle's battery B with a fixed reference to determine when the engine is running. For this, the terminal 8 of section 26b is maintained at about 12.1 V by means of the parallel circuit consisting of resistor 68 and the Zener diode 72 which is rated at 12.1 V. The input terminal 7 of comparator section 26c is at the center of the voltage divider 64, 66 which maintains the voltage at that terminal at about 91% of the battery voltage. When the vehicle's engine is not running, the battery is at the customary 12.6 V so that the voltage at terminal 7 is about 11.4 V which is less than the voltage at terminal 8. Therefore, the voltage at the output terminal 9 of comparator section 26c floats which allows the system to become armed.

On the other hand, when the vehicle's engine is running, the battery voltage increases to about 14.4 V so that the voltage at terminal 7 of comparator section 26c increases to about 13.1 V which is higher than the voltage at terminal 8. At that point, the voltage at the output of comparator section 26c goes low, i.e., to near electrical ground, thereby preventing the capacitor 38 from charging which, in turn, prevents the system from becoming armed.

In summary, then, the comparator section 26c prevents the system from becoming armed and enabling the alarm module 16 when the engine is running; when the engine is not running, the system can be armed and the alarm module 16 enabled if the above conditions shown in the table respecting the voltage at the input terminals 4 and 5 of comparator section 26b are satisfied.

The fourth comparator section 26d uses the motion detector 15 to prevent the power door lock module 17 from becoming operative when there are moving occupants in the vehicle. For this, terminal 11 of section 26d is provided with a fixed voltage of about 5 V via the voltage divider 82, 84. Terminal 10 of that same comparator section receives the output from comparator section 26a which, as noted above, is controlled by the motion detector 15. When the motion detector senses that the vehicle has an occupant, terminal 10 will stay at about 9 V which is higher than the 5 V at terminal 11. Therefore, the output terminal 12 will go to ground, thereby disabling the door lock module 17. On the other hand, when detector 12 no longer senses motion in the vehicle, the voltage at the output terminal 3 of comparator section 26a and, therefore, the voltage at terminal 10 will go to ground so that the voltage at the output terminal 12 of comparator section 26d will go high, being driven by module 17, and the vehicles doors will lock.

The various electrical components of the system may have the following values:

Resistor 32=510K Resistor 64=100K
Resistor 44=150K Resistor 66=1M
Resistor 46=390K Resistor 68=100K
Resistor 52=510K Resistor 82=1M
Resistor 54=1.5M Resistor 84=680K
Resistor 56=190K Diode 36=1n4001
Resistor 58—1M Capacitor 38=33 $\mu f$
Resistor 62=1M Diode 72=Zener (12.1)

A suitable motion detector 15 is available from Directed Electronics, Inc. under the model designation 508 T Field Disturbance Detector; a suitable alarm module 16 may be obtained from Z-Loc Industries, Inc., Norwell, Mass. under the designation M-2, and an appropriate door lock module 17 may be obtained from said Z-Loc Industries, under the designation PDL module.

It will be seen from the foregoing that my improved passive security system delays or prevents the arming or activation of the system at inopportune times such as when the space being protected is already occupied by people or pets and, in the case of motor vehicle's, when the vehicles engine is running. My invention also prevents the system from becoming armed prematurely and locking the doors into the space to be protected when that space is still occupied. Thus, the system reduces the incidence of false alarms and reduces the chances of someone already present in a secured space being unable to exit that space in the event of an emergency.

While providing the aforesaid advantages, my improved security system does not cost appreciably more than comparable systems on the market because the aforesaid advantages can be obtained using the very same detection devices used to trigger the alarms of conventional security systems.

It will thus be seen that the objects set forth above, among those made apparent from the preceding description, are efficiently attained. Also, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention described herein.

I claim:

1. An electronic security system for protecting a vehicle having an interior space with a door into said space, said system comprising settable vehicle securing means which, when set by an arming signal, secures the vehicle in response to a trigger signal;
   an arming circuit which, when activated, provides an arming signal to set said securing means;
   means for activating and deactivating said arming circuit;
   detection means for detecting a presence in said space and providing a trigger signal to said securing means in response thereto;
   inhibiting means for inhibiting activation of said arming circuit so long as a presence is detected in said space before said securing means are set;
   locking means for locking a door into said space, said locking means each having a locked position and an unlocked position, and
   control means responsive to said arming signal for controlling the looking means so as to inhibit the looking means from assuming the locked position when a presence is detected in said space before said securing means are set.

2. The system defined in claim 1 wherein the inhibiting means receive and respond to said trigger signal by preventing activation of said arming circuit so that the same detection means are used to prevent activation of said arming circuit before the securing means are set and to trigger the securing means after the securing means are set.

3. An electronic security system for protecting an interior space comprising
   settable security means for producing, when set by an arming signal, an alarm indication in response to a trigger signal;
   an arming circuit, which, when activated, provides an arming signal to set said security means;
   means for activating and deactivating said arming circuit;
   detection means for detecting a presence in said space and providing a trigger signal to said security means in response thereto;
   inhibiting means responsive to said trigger signal for inhibiting activation of said arming circuit so long as a presence is detected in said space before said security means are set;
   locking means for locking doors into said space, said locking means each having a locked position and an unlocked position, and
   control means responsive to said arming signal for controlling the locking means so as to inhibit the locking means from assuming a locked position when a presence is detected in said space before said security means are set.

4. The system defined in claim 3
   wherein the interior space is the interior of a vehicle, and
   further including
   a motive source for powering said vehicle,
   a battery having a battery voltage and connected electrically to said motive source and to said arming circuit,
   means for providing a reference voltage different from said battery voltage,
   a voltage comparator having a first input receiving said reference voltage and a second input receiving said battery voltage, said voltage comparator producing an output signal when the battery voltage differs from the first reference voltage by a predetermined voltage amount, and means for applying said output signal to said arming circuit to prevent activation of said arming circuit when said voltage amount is reached before said security means are set.

5. The system defined in claim 4 and further including delaying means for inhibiting activation of said arming circuit when said battery is first disconnected from and then reconnected to said arming circuit.

6. The system defined in claim 3 wherein said arming circuit includes a voltage comparator.

7. the system defined in claim 3
wherein said activating and deactivating means include
a receiver and decoder circuit connected to said arming circuit, and
a coded transmitter for emitting signals to said receiver and decoder circuit.

* * * * *